United States Patent [19]
Dutro et al.

[11] Patent Number: 5,158,067
[45] Date of Patent: Oct. 27, 1992

[54] WOK ADAPTED PORTABLE FOOD COOKER

[75] Inventors: William A. Dutro, Cove; S. Ty Measom, Logan, both of Utah

[73] Assignee: Dutro Company, Emeryville, Calif.

[21] Appl. No.: 779,871

[22] Filed: Oct. 21, 1991

[51] Int. Cl.$^5$ ............................................. F24C 3/00
[52] U.S. Cl. ................................. 126/39 R; 126/50; 126/40
[58] Field of Search ............. 126/39 R, 50, 40, 41 R

[56] References Cited

U.S. PATENT DOCUMENTS

| | | | |
|---|---|---|---|
| 302,015 | 7/1884 | Musgrave | 126/40 |
| 3,785,361 | 1/1974 | Mejyr et al. | 126/41 R |
| 4,062,341 | 12/1977 | Panzarella | 126/41 R |
| 4,356,988 | 11/1982 | McIntosh | 126/41 R |
| 5,038,749 | 8/1991 | Jerry et al. | 126/40 |

Primary Examiner—Carroll B. Dority
Attorney, Agent, or Firm—Harris Zimmerman

[57] ABSTRACT

A portable fluid fueled food cooker has a fuel burner housing which can support and stabilize a wok of the kind having a rounded bottom. In the preferred form, the housing has an annular sidewall encircling a combustion chamber and an apertured inner sleeve having an upper edge that is of smaller diameter than the sidewall and which forms an open centered circular lip proportioned to receive and seat the rounded bottom of the wok. The housing attaches to a post and the post attaches to a base platform having an indentation shaped to receive and seat a pressurized fluid fuel tank. The tank is retained by a clamp arm extending from the post. The housing, post and base are preferably disengagable from each other to facilitate carrying and storage of the cooking apparatus.

8 Claims, 3 Drawing Sheets

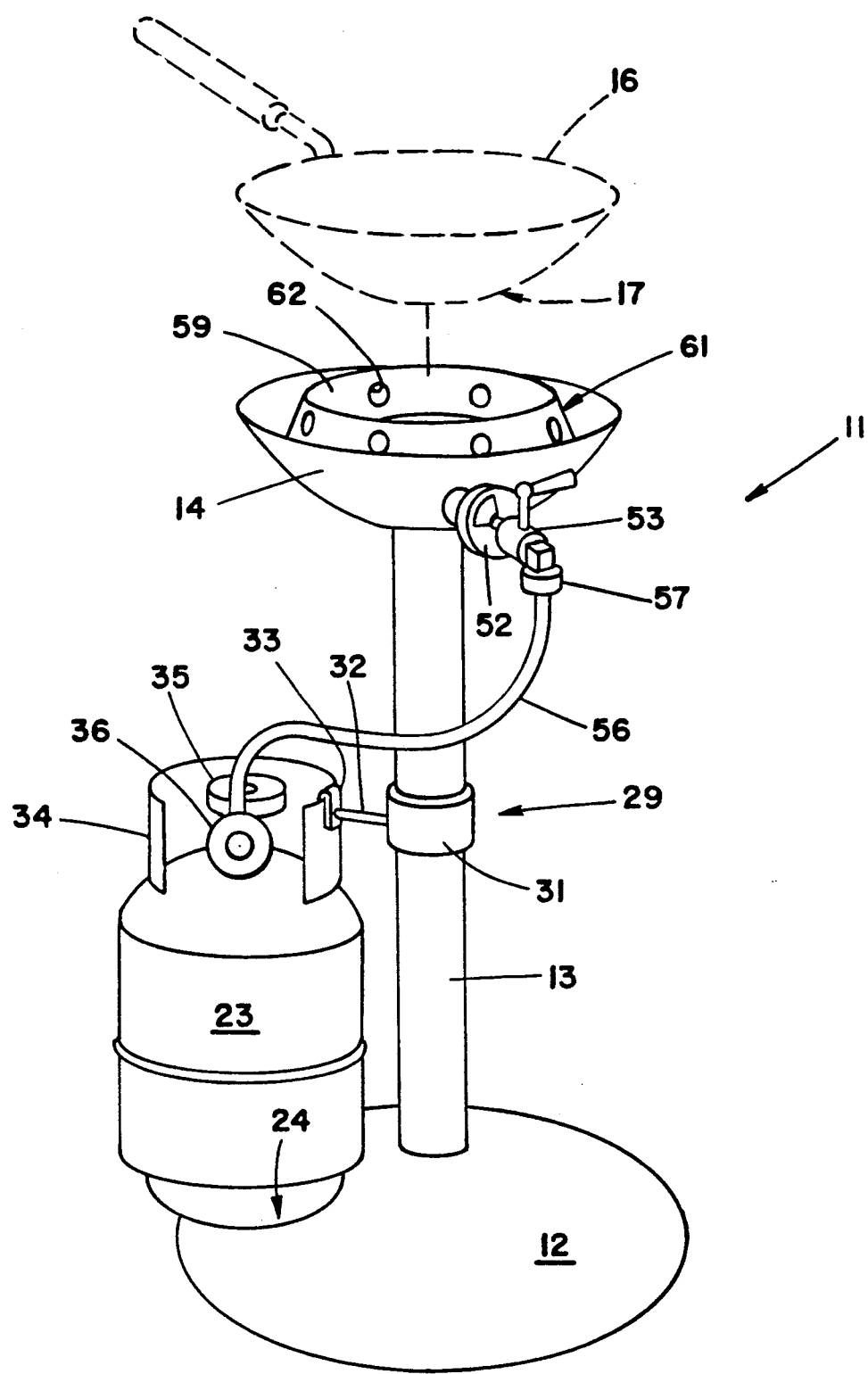
FIG_1

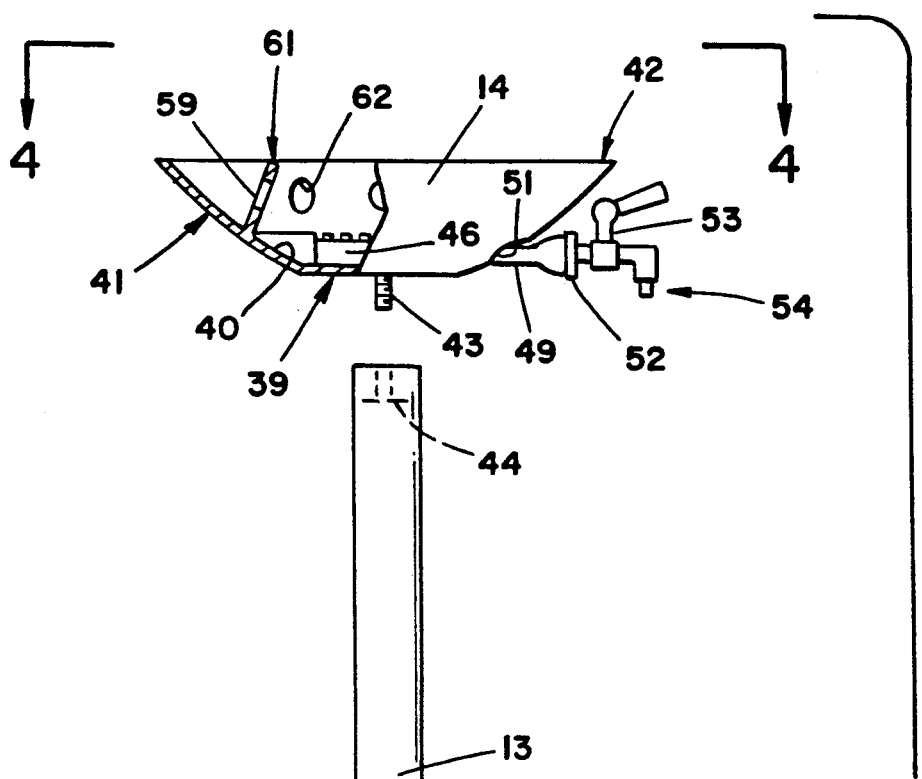
FIG_2

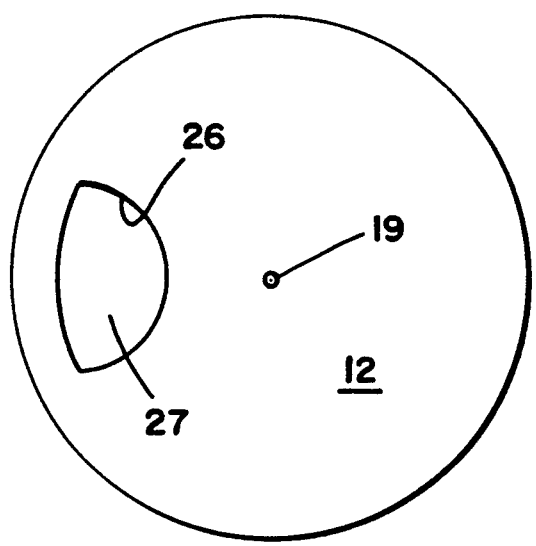
FIG_3
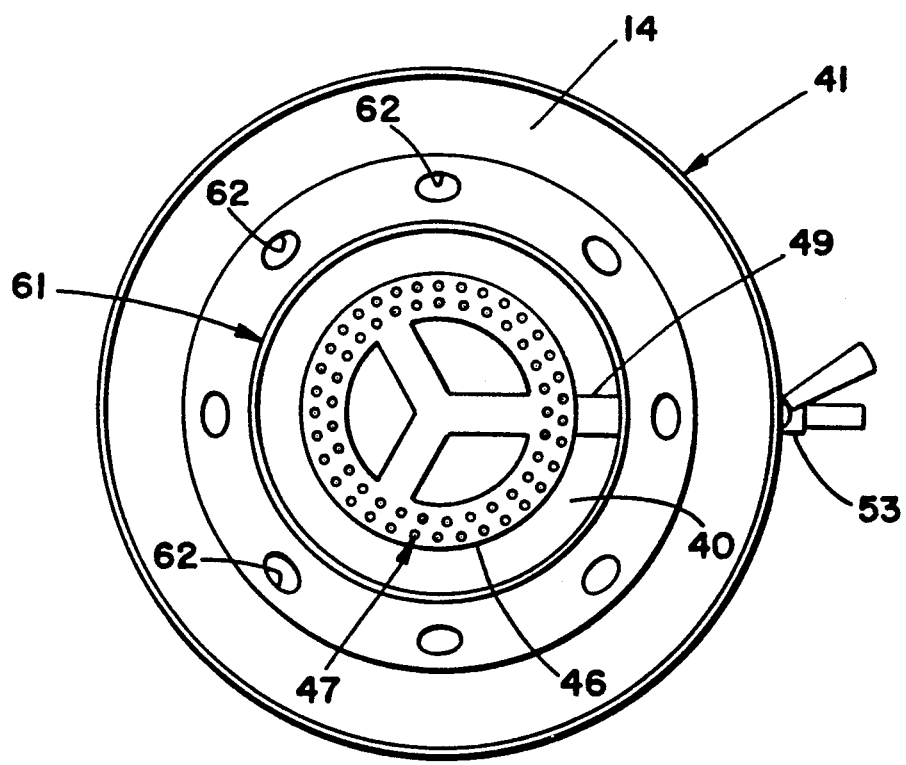
FIG_4

WOK ADAPTED PORTABLE FOOD COOKER

TECHNICAL FIELD

This invention relates to apparatus for cooking foods and more particularly to compact fluid fuel burning cookers of the type that can be easily transported and which are suitable for outdoor use.

BACKGROUND OF THE INVENTION

Cooking of foods in woks has become increasingly popular because of the advantages and versatility of the bowl shaped pan. The rounded bottom of the wok reduces the amount of cooking oil that is needed as the area to be covered with oil is smaller. The high sloping sides of the container inhibit spattering. The smooth continuous curvature of the wok facilitates stirring and tossing of food materials during cooking such as during stir-frying. The rounded geometry also makes a wok highly suitable for cooking different sized batches of food on different occasions.

The curving bottom makes the wok unstable if it is rested on a flat surface such as is typically present over the burners or heating elements of a conventional stove or cooking range. This problem has traditionally been resolved by placing a ring shaped support over the burner or other heating element. The rounded bottom of the wok can then be seated in the ring.

The ring support may also be used when cooking on small portable stoves of the type that are used outdoors, on camping trips or at picnics or the like but is not ideally suited for this purpose. Many stoves of this type do not have a sizable flat area surrounding the burner and thus inadvertent lateral displacement of the support ring can cause a toppling of the wok and its contents. Optimum cooking operations may also require an even distribution of heat around the circumference of the wok that is not provided by the configuration of many small portable cooking stoves. The support ring can also be overlooked when preparing for an outdoor cooking operation or be left behind when returning from such an activity. If a wok cooking operation is to be followed by cooking of something in a different container, one is faced with the problem of grasping, removing and storing the ring while it is still in a hot condition.

The present invention is directed to overcoming one or more of the problems discussed above.

SUMMARY OF THE INVENTION

In one aspect, the present invention provides a portable cooker adapted for heating foods in a wok of the type having a rounded bottom. Components of the cooker include a base, a post which extends up from the base and a burner housing secured to the upper end of the post. The housing has an upwardly directed sidewall which extends around a combustion chamber and an open centered circular lip at the top of the chamber that is proportioned to receive and seat the rounded bottom of the wok. Additional components include a fluid fuel burning heating element disposed in the combustion chamber below the circular lip and means for supplying fluid fuel to the heating element.

In another aspect, the invention provides a knockdown portable cooker for heating foods that are contained in a wok and for supporting and retaining a cylindrical tank of the type which contains pressurized fluid fuel. A base platform has a convex upper surface with a flat floored indentation at an off center location that is shaped to receive and seat the fuel tank. A tubular post extends up from a center location on the base platform and means are present for selectively engaging and disengaging the base platform and the post. A slidable sleeve encircles the post and has means for gripping the fuel tank. An annular housing is attached to the upper end of the post in a centered relationship with the post and has a floor and an annular sidewall that extends upwardly to form the outer rim of the housing. Another portion of the housing is a sleeve with a lower end joined to the sidewall and a circular upper edge that is coaxial with the outer rim and of smaller diameter, the sleeve portion having openings spaced apart around its circumference. The upper edge of the sleeve portion is proportioned to receive an seat the rounded bottom of the wok. The housing and the post may be selectively engaged and disengaged from each other. A fluid fuel burning heating element is disposed in the housing below the circular upper edge of the sleeve portion and means are present for selectively delivering fuel from the tank to the heating element.

A portable cooker embodying the invention provides a seat for the rounded bottom of a wok without requiring a separate accessory for the purpose. The wok seat is not subject to lateral displacement and thus provides a highly stable support for the wok. In the preferred form, the configuration of the cooker provides an even distribution of heat around the circumference of the wok including under windy conditions. The preferred embodiment also supports and securely retains a pressurized fluid fuel tank of the standardized form with a minimum of structural complication for the purpose. The cooker may be light and compact and, in the preferred form, may be easily disassembled into component parts to facilitate transportation and storage.

The invention, together with further aspects and advantages thereof, may be further understood by reference to the following description of a preferred embodiment and by reference to the accompanying drawings.

BRIEF DESCRIPTION OF THE DRAWINGS

FIG. 1 is a perspective view of a wok adapted portable cooker in accordance with the preferred embodiment of the invention.

FIG. 2 is a partially broken out exploded perspective view of the portable cooker of FIG. 1 showing components in a disengaged and separated condition.

FIG. 3 is a plan view of a base platform component of the cooker taken along line 3—3 of FIG. 2.

FIG. 4 is a plan view of a housing component of the apparatus of the preceding figures taken along line 4—4 of FIG. 2.

DETAILED DESCRIPTION OF THE PREFERRED EMBODIMENT

Referring initially to FIG. 1 of the drawings, primary components of a knockdown portable cooker 11 in accordance with this embodiment of the invention include a base or platform 12, a tubular post 13 which extends up from the base and a fuel burner housing 14 which is configured to seat and support a wok 16 of the traditional bowl shaped configuration. Such woks 16 have a rounded bottom 17 rather than a flat underside of the type found on frying pans and cooking pots and the like.

Referring jointly to FIGS. 1 and 2, the base platform 12 in this example of the invention is circular and has an inverted dish shaped configuration. A short threaded stud 19 extends up from the center of the convex upper surface 21 of base 12 to enable selective engagement and disengagement of the base and the lower end of post 13. Stud 19 engages with a short sleeve 22 contained within the lower end of post 13 and which has an internally threaded passage 23 for receiving the stud.

Base 12 functions as a support for a pressurized fluid fuel tank 23. The tank 23 of this example is of the standardized form that is used to contain propane fuel for gas operated appliances although the cooker can also be adapted to use containers of other configuration and other fuels. An indentation 24 in the upper surface 21 of base 12 at an off center location on the base provides a seat for a portion of the bottom of tank 23. Indentation 24 is defined by an arcuate slot 26 in base 12 that conforms with the outline of the bottom of tank 23 and by a flattened tongue region 27 of the base 12 that extends horizontally below the slot and which conforms in outline with the slot as may be seen by referring to FIGS. 2 and 3 in conjunction.

Referring again to FIGS. 1 and 2, secure retention of the fuel tank 23 is assured by means 29 for selectively fastening the tank to post 13. Such means 29 in this embodiment includes an annular sleeve 31 which encircles post 13 and which is slidable along the post. An arm 32 extends radially from sleeve 31 and has an inverted U-shaped clamp 33 at the end proportioned to fit onto the top edge of the curved protective shield 34 that partially encircles the fittings, such as valve 35 and pressure regulator 36, which are situated at the top of a standardized propane tank 23. A set screw 37 at clamp 33 may be tightened to secure the clamp to shield 34.

Referring to FIGS. 2 and 4 in conjunction, the burner housing 14 is shaped to define an open topped combustion chamber 40 and in this embodiment of the invention has a dish shaped configuration which includes a flat circular floor region 39 and an annular sidewall 41 that curves upwardly and outwardly from the periphery of the floor region. The outer rim 42 of housing 14, which is the upper edge of sidewall 41, preferably has a diameter conforming to the diameter of the woks with which the cooker 11 is to be used although this is not essential in all instances. Many woks, for example, have a diameter of about 14 inches.

Another threaded stud 43 extends downward from the center of the underside of housing 14 to enable selective engagement and disengagement of the housing and support post 13. Stud 43 engages in a threaded sleeve 44 that is secured within the upper end of post 13 and which may be similar to the previously described sleeve 22 at the bottom of the post.

The heating element in this example of the invention is a ring shaped hollow gas burner fitting 46 of the conventional form which is secured to the floor region 39 of housing 14 in coaxial relationship with the housing sidewall 41 and which has a circular array of fuel emitting apertures 47. A fuel supply pipe 49 extends horizontally from fitting 46 through an opening 51 in sidewall 41 and has an air aspirator 52 at its outer end that may be of the known form that intermixes air with a fuel flow. The fuel flow is received through a flow rate control valve 53 that extends from aspirator 52 and which has a threaded intake nipple 54. Referring to FIG. 1 in conjunction with FIG. 2, fuel from tank 23 is delivered to valve 53 through a flexible tube 56 having a threaded connector 57 at the upper end that engages with nipple 54.

Housing 14 has a tapered inner sleeve 59 which extends up from the inner side of sidewall 41 to form an open centered circular lip 61 into which the rounded bottom of a wok may be received and seated. The circular lip 61 is concentric with the outer rim 42 of housing 14 and is of smaller diameter in order to be radially spaced from the rim. Preferably, the lip 61 is also coplanar with the housing rim 42 as there may be instances when it is desired to place a flat bottomed container or a grill on the cooker 11. Coplanarity of the lip 61 and rim 42 provides a more extensive support base for such flat objects.

A series of openings 62 in sleeve 59 are spaced apart at equiangular intervals around the circumference of the sleeve. The apertures or openings 62 enable outflow of combustion gases when a wok is in place and, in conjunction with the housing sidewall 41, serve to channel heat to the upper portions of the wok in manner which distributes such heat around the circumference of the wok.

The housing 14 is capable of providing stable support for a wok if the upper portions of housing sidewall 41 are not present but the above described construction is preferred as the upper part of the sidewall provides beneficial effects. These include the above described channeling of heat to the upper portions of the wok with a desirably uniform distribution and the above described providing of more extensive support for flat bottom containers or a grill. The upper portion of sidewall 41 further functions as a windscreen.

As the housing 11, post 13 and base 12 can be easily disengaged from each other and re-engaged with each other, the cooker 11 may be stored in a compact space and may be transported and carried in box, bag or the like that is less bulky than the assembled unit.

While the invention has been described with reference to a single preferred embodiment, many modifications and variations of the construction are possible and it is not intended to limit the invention except as defined in the following claims.

We claim:

1. A portable cooker adapted for heating foods that are disposed in a wok which has a rounded bottom, wherein said cooker comprises a base, a post extending upward from said base and having upper and lower ends, a burner housing forming a combustion chamber that is open at the top, said burner housing being secured to said upper end of said post and having an upwardly directed sidewall which formed said combustion chamber, said housing further having a ring extending upwardly from a bottom of said burner housing and spaced inwardly of an upper edge of said housing and upwardly to approximately the same elevation of said upper edge of said housing, said ring having openings thereabout and the space inwardly of an upper annular surface of said ring being free of any obstructions to receive and seat said rounded bottom of said wok thereat, a fluid fuel burning heating element disposed in said chamber below said ring, said heating element being spaced apart from said ring and said open top of said combustion chamber in the downward direction and means for supplying fluid fuel to said heating element.

2. The portable cooker of claim 1 wherein aid fluid fuel is contained in a tank which has a bottom region and wherein said base has an upper surface with an indentation therein shaped to receive and seat at least a portion of said bottom region of said tank.

3. The portable cooker of claim 2 wherein said base is a dished disk having a convex upper surface and wherein said disk has an arcuate slot conforming with said portion of said bottom region of said tank and has a flat horizontally extending tongue portion of said disk situated below said slot and which forms a floor of said indentation.

4. The portable cooker of claim 2 further including means for selectively fastening said tank to said post.

5. The portable cooker of claim 4 wherein said tank is a pressurized fluid fuel tank having an outlet valve at the upper end an having an upwardly extending protective shield which partially encircles said valve and wherein said means for selectively fastening said tank to said post includes a sleeve which is slidable along said p<st, an arm extending outward from said sleeve and a clamp at the end of said arm positioned for selective engagement with said shield of said tank.

6. The portable cooker of claim 1 further including means for selectively disengaging said base, said post and said housing from each other.

7. The portable cooker of claim 1 further including a first threaded rod extending upward from said base, a second threaded rod extending downward from said housing and wherein threaded axial passages are present in said upper and lower ends of said post to engage said first and second threaded rods to secure said base and post and housing together in a disengagable manner.

8. A knockdown portable food cooker for heating foods that are contained in a wok having a rounded bottom and for supporting and retaining a cylindrical fuel tank of the type which contains pressurized fluid fuel, comprising:

a base platform having a convex upper surface with a flat floored indentation at an off center location thereon, said indentation being shaped to receive and seat said fuel tank, a tubular post having upper and lower ends and which extends up from a center location on said base platform, means for selective engaging and disengaging said base platform and said post, a sleeve encircling said post and being slidable therealong and having means for gripping said tank, an annular housing attached to said upper end of said post in a centered relationship therewith, said housing having a floor and an annular sidewall which encircles said floor and extends upwardly therefrom to form an outer rim of said housing, said housing further having an open centered annular sleeve portion with a lower end joined to said sidewall and a circular upper edge that is of smaller diameter than said outer rim and which is coaxial therewith, said sleeve portion of said housing having openings which are spaced apart around the circumference thereof, said upper edge of said sleeve portion being proportioned to receive and seat said rounded bottom of said wok, means for selectively engaging and disengaging said post and said housing, a fluid fuel burning heating element disposed in said housing below said circular upper edge of said sleeve portion thereof, and means for selectively delivering fuel from said tank to said heating element.

* * * * *